Sept. 26, 1967  W. H. STEPHENSON  3,343,775
FLUID CUSHION
Filed May 6, 1966
3 Sheets-Sheet 1
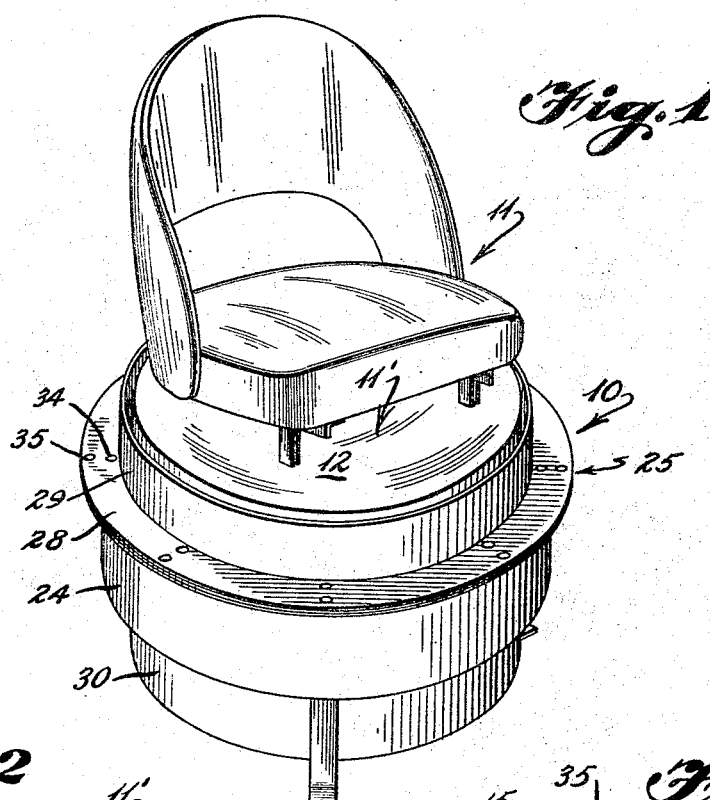
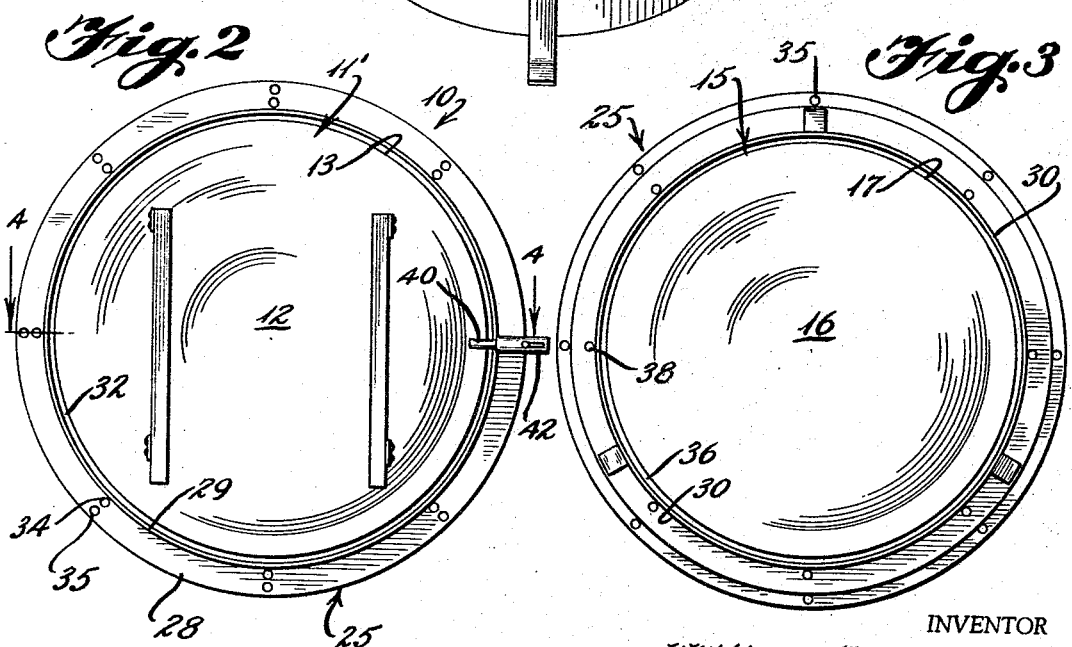
INVENTOR
William H. Stephenson
BY
ATTORNEYS Sept. 26, 1967 W. H. STEPHENSON 3,343,775
FLUID CUSHION
Filed May 6, 1966 3 Sheets-Sheet 2
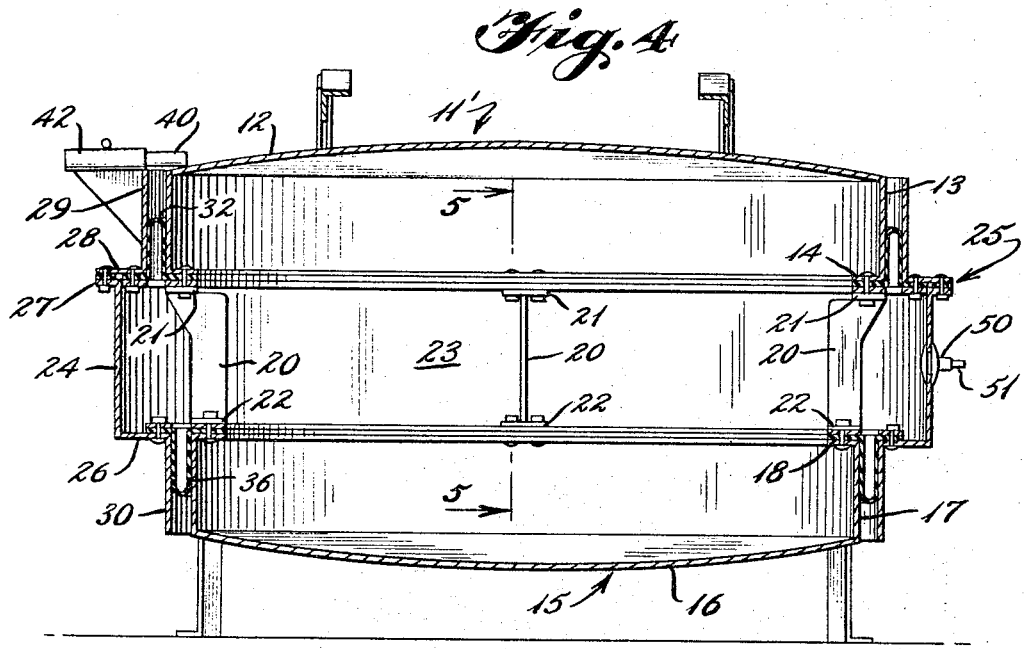
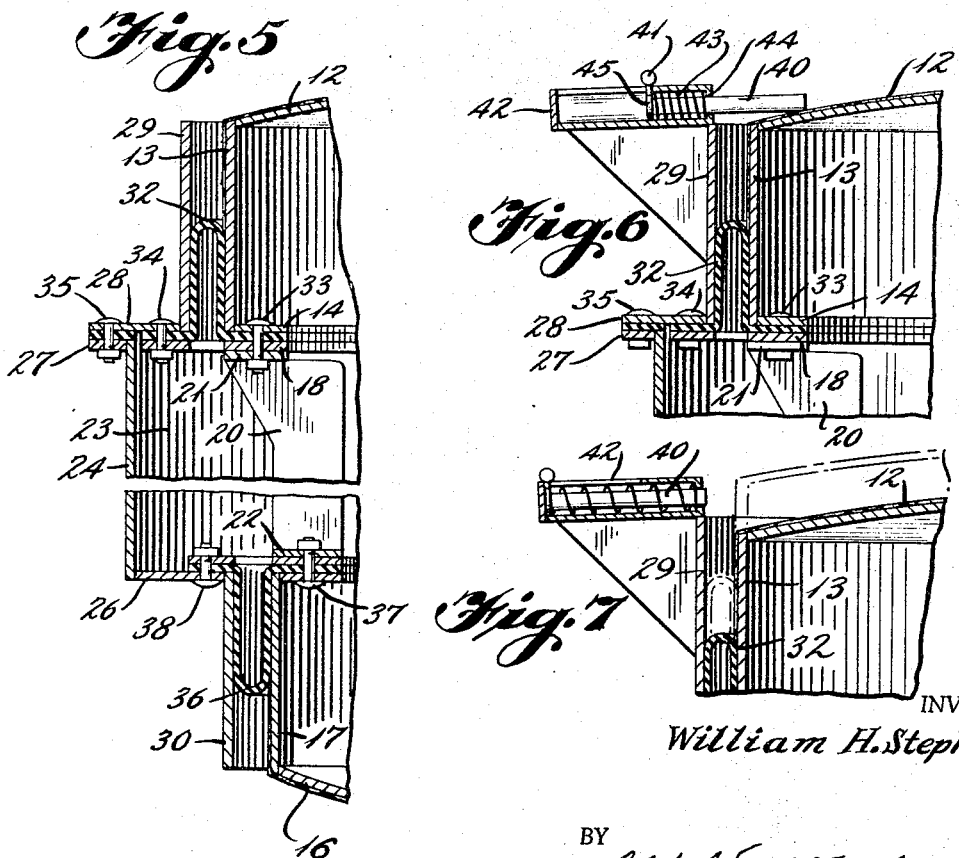
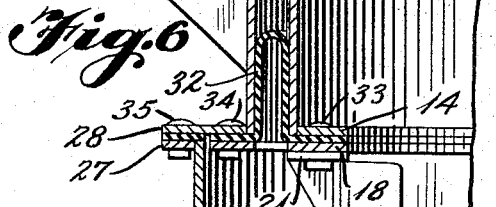
INVENTOR
William H. Stephenson
BY
ATTORNEYS Sept. 26, 1967 W. H. STEPHENSON 3,343,775
FLUID CUSHION
Filed May 6, 1966 3 Sheets-Sheet 3
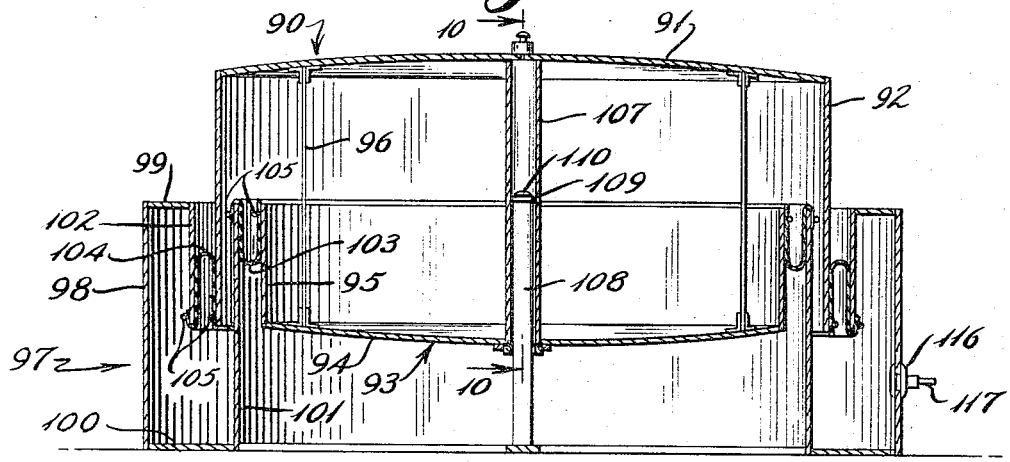
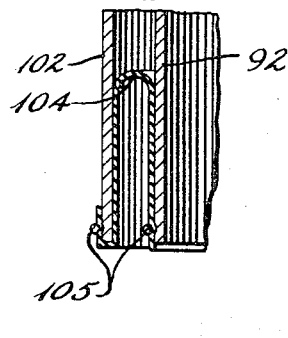
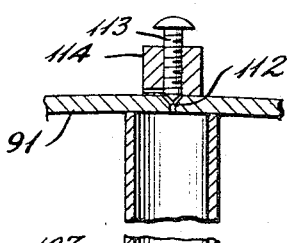
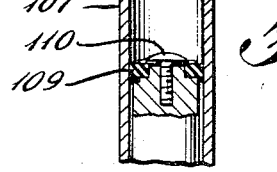
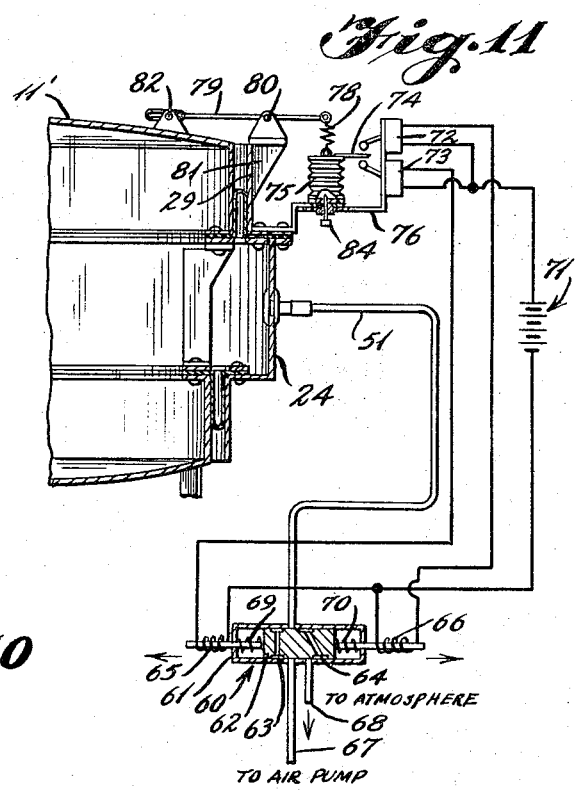
INVENTOR
William H. Stephenson
BY
ATTORNEYS

United States Patent Office 3,343,775
Patented Sept. 26, 1967

3,343,775
FLUID CUSHION
William H. Stephenson, Roanoke Rapids, N.C.
(1302 Fairfax Ave., Wilson, N.C. 27893)
Filed May 6, 1966, Ser. No. 548,212
8 Claims. (Cl. 248—400)

This invention relates to the transmission of motion and more particularly to a cushion by means of which a force or impact may be absorbed with a maximum of softness and in a minimum of space.

While the invention is particularly adapted for the support of a seat in a vehicle, it obviously is adapted for other purposes where cushioning is desired.

The cushioning of road shocks or irregularities in terrain traversed by vehicles of various kinds is highly developed. Various fluid systems using liquids or gases or combinations thereof have been proposed heretofore. However, in relatively simple fluid systems involving single pistons heretofore available, in order to avoid displacement of the seat beyond permissible limits the transmission of shock has been great compared to that which is possible through the use of the present invention.

Accordingly, it is an object of the present invention to provide a cushioning device especially adapted for a vehicle seat in which a substantially softer ride is possible, utilizing comparable space, than that which has heretofore been obtainable.

A further object of the invention is the provision of a cushioning device with control means for automatically positioning the supporting member responsive to the weight or force ordinarily applied continuously thereto.

These and other objects of the invention will become apparent from the following description in combination with the accompanying drawings, in which:

FIG. 1 is a perspective of a cushioning device with a seat applied thereto in accordance with the present invention;

FIG. 2, a top plan of the cushioning device;

FIG. 3, a bottom plan of the cushioning device;

FIG. 4, a section on the line 4—4 of FIG. 2, to an enlarged scale;

FIG. 5, a section on the line 5—5 of FIG. 4, to an enlarged scale;

FIG. 6, a detail illustrating the retractable stop in extended position;

FIG. 7, a detail illustrating the retractable stop in retracted position;

FIG. 8, a section through a modified form of the invention;

FIG. 9, a detail illustrating the flexible fluid-tight connection between the piston wall and the housing of the air chamber of FIG. 8;

FIG. 10, a section, to an enlarged scale, on the line 10—10 of FIG. 8; and

FIG. 11, a schematic of control means for automatically adjusting the height of the upper piston.

Briefly stated, the present invention includes spaced pistons of unequal effective areas connected together and communicating with a chamber, the latter fixed with respect to the pistons, whereby movement of the connected pistons slightly changes the volume encompassed by them and the housing, whereby the piston assembly can support a relatively heavy weight and the transmission of sudden force is cushioned substantially greater than would be provided in a single piston assembly of comparable volume.

With further reference to the drawings, there is illustrated in FIG. 1 a fluid cushion 10 on which a seat 11 is mounted. The seat may be of conventional type having little or no padding.

The cushion includes a piston comprising a first or upper piston member 11' having a top 12, a lateral side 13 and bottom flanges 14, and a second or lower piston member 15 having a bottom 16, a lateral side 17, and a flange 18. As illustrated, the diameter of upper piston member 11' is slightly larger than that of lower piston member 15.

The upper and lower piston members are connected together by spaced struts or connecting links 20 which have laterally disposed flanges 21, 22 at each end, connected to the flanges of the upper and lower piston members. A fluid chamber 23 of substantially toroidal shape is defined by side wall 24, an upper rib 25, and a lower flange 26. The rib 25 includes an upper flange 27 of side wall 24 and a lower flange 28 connected to upstanding wall 29. Flange 26 has a lower depending wall 30.

In order to provide flexible fluid-tight seals, a boot or flexible seal 32 has a central portion extending between the piston wall 13 and the wall 29 and secured by fastening means 33, 34, 35 extending through the piston flanges and struts and the rib 25, as indicated. In like manner, a flexible boot 36 is connected by fasteners 37, 38 to the flange of the lower piston and the flange 26 of the air chamber.

With reference to FIGS. 6 and 7, a plunger 40 having an operating detent 41 is mounted in a housing 42 on the wall 29. A spring 43 is confined between the collar 44 of the plunger housing 42 and the head 45 of the plunger. The spring is selected to normally hold the plunger retracted within the housing as shown in FIG. 7. However, when the pressure within the piston assembly tends to raise the pistons so that the wall 12 engages the plunger as indicated in FIG. 6, such engagement prevents further upward movement of the piston assembly and prevents retraction of the piston 40.

A connector 50 with a line 51 is provided in the wall 24 of the chamber in order that appropriate fluid pressure may be applied within the enclosure and also to permit adjustment thereof, as will be described presently in the description of FIG. 11.

It will be seen from an examination of FIG. 4 that downward motion of the piston with reference to the toroidal chamber will cause a slight decrease in volume of the space enclosed thereby. This results from the fact that the upper piston member 11' is larger in diameter than the lower piston member 15; that the upper piston member 11' moves downwardly with respect to chamber 24 to decrease the volume of the space between it and the chamber and that this decrease is larger than the increase provided by the lower piston member 15 moving an equal distance beneath the chamber. The result is that even though a substantially large space is enclosed the effective area difference which is available for the application of pressure in order to resist forces tending to move the piston assembly in either direction, is relatively small, and may be, for example, one-eighth or one-tenth that of a conventional single piston cushion.

Thus, even though correspondingly greater pressure is required to support a static weight in the device of the present invention, the proportionate volume change caused by road roughness is much smaller. Thus, the increase in pressure caused by such decrease in volume is much smaller in applicant's device. Hence, the force or shock transmitted is correspondingly much less than in a conventional piston arrangement, resulting in a softer ride.

In actual testing of an embodiment of the invention by passengers it has been found that road shock has been absorbed to a far greater extent than had previously been experienced in conventional seats.

Reference is made to FIG. 11, in which is illustrated the automatic positioning control. The control apparatus of FIG. 11 is useful in a situation in which it is desired that the position or height of the cushion assembly remains the same regardless of the static weight of the person on the seat. Thus, an operator weighing 200 pounds would be positioned at the same height as one weighing 150 pounds, unless adjustment were made in the control.

The control means includes a valve 60 connected to the air line 51 of the cushion. The valve has a housing 61 and a movable valve member 62 with passages 63, 64, the valve member operated by solenoids 65, 66. It can be seen from examination of the drawing that the valve member can be in a neutral position, as indicated, in which line 51 is sealed. Movement of the valve member to the right positions passage 63 in communication with line 51 and line 67 to an air pump (not shown). Movement of the valve member to the left positions line 51 in communication with passage 64 and line 68 to the atmosphere. Thus, the valve may selectively seal line 51, connect it with an air pump for the purpose of increasing pressure within the enclosure, or connect it with the atmosphere for the purpose of decreasing pressure within the enclosure. Within the housing 61, springs 69, 70 are provided, which tend to maintain the valve member in neutral position.

The valve member is controlled by the solenoids, which may be selectively connected to a source of power 71 through switches 72, 73. The switches are engageable by an arm 74 mounted on a bellows 75. The bellows and the switches are mounted on a bracket 76 which is connected to the wall 24. One end of the bellows is connected by take-up spring 78 to the end of a lever 79 which is pivotally mounted intermediate its ends on a pin 80 supported by bracket 81. The other end of the lever is pivotally connected by a pin 82 to the top of the piston 11'. The bellows has a time-delay bleed adjustment 84 at its lower end.

In the operation of the device, the lever 79 is adjusted so that when the operator is in his seat and the cushion is depressed an appropriate amount, the arm 74 of the bellows is in the neutral position as indicated in FIG. 11. Sporadic movement of the cushion by ordinary road shock does not shift the arm sufficiently to operate the switches 72 or 73, because of the delay required for the bellows to shift its position. However, if an operator of substantially different weight is in the seat, this operates the lever 79 and bellows arm 74 for a sufficient length of time to operate the appropriate switch 72 or 73.

It will be observed that a heavier weight, which tends to move the cushion downwardly, closes switch 72 to solenoid 66, thereby moving the valve member to the right to permit increase of the air pressure. When the pressure within the enclosure has increased sufficiently to raise the cushion to the predetermined position, then the lever 79 will move bellows arm 74 away from the switch 72 to de-energize solenoid 66 and permit the valve member to return to neutral position. Similarly, if the person is of lighter weight, so that the cushion is substantially higher, then bellows arm 74 will close switch 73 to cause operation of solenoid 65 in order to vent line 51 to the atmosphere. After the pressure in the enclosure has decreased sufficiently to permit return of the bellows arm 74 to neutral position, the solenoid will be de-energized.

In order to prevent the cushion from raising when the operator dismounts, the retractable piston 40, as disclosed in FIGS. 6 and 7, is shifted into the position of FIG. 6. As soon as the operator sits on the seat and lowers it from close engagement with the piston 40, the latter is automatically retracted as indicated in FIG. 7.

A modification of the invention is illustrated in FIGS. 8 through 10. Here, the upper piston member 90 has an upper wall 91 and side wall 92. The lower piston member 93 has a lower wall 94 and side wall 95. The walls 91, 94 are connected by spaced rods 96.

An auxiliary chamber is provided by a substantially annular housing 97 having an outside wall 98, top wall 99, bottom wall 100, inner wall 101, and intermediate wall 102. A flexible boot 103 is mounted between wall 95 of piston 93 and the wall 101. Similarly, a boot 104 is mounted between the lower end of the wall 92 and of the intermediate wall 102 of the housing 97. While various means for mounting the boots may be employed, wire tension bands 105 encircling the walls have been found suitable, a detail thereof appearing in FIG. 9.

In order to axially position the piston members with respect to the housing 97, a tube 107 is connected between the central portions of the walls 91 and 94 of the pistons and is received on a guide rod 108 which is supported on the vehicle either directly or indirectly. The top of the guide rod 108 preferably has a sealing ring 109 held by a fastening means 110. Similarly, the lower wall 94 preferably has a sealing ring 111 which engages the guide rod 108. The upper wall 91, which is in communication with the interior of the tube 107, has a bleed orifice 112 the passage through which is adjustable by bleed screw 113 adjustably mounted in block 114. By appropriate adjustment of the bleed screw movement of the piston assembly on the guide rod 108 may be dampened or delayed.

A connector 116 in the wall 98 has a tube 117 attached thereto for connection to a source of fluid pressure such as an air pump. The control of FIG. 11 may be applied to the modified form of the invention if desired.

While the expression "fluid" has been used herein, this is understood to refer primarily to gases such as air, although other fluids may obviously be employed.

It will be obvious to those skilled in the art that various changes may be made in the invention without departing from the spirit and scope thereof and therefore the invention is not limited by that which is illustrated in the drawing and described in the specification, but only as indicated in the accompanying claims.

What is claimed is:

1. A fluid cushion comprising spaced first and second piston members, means connecting said piston members so that the distance therebetween is substantially constant, said piston members mounted for reciprocation along an axis which is substantially transverse to the piston members, the first piston member having an area transverse to said axis which is larger than the corresponding area of said second piston member, an enclosed fluid chamber housing, said fluid chamber housing having spaced portions, fluid-tight flexible means connecting said first piston member to one portion of said fluid chamber housing and other fluid-tight flexible means connecting said second piston member of the other portion of said fluid chamber housing, whereby said piston members and said housing form a fluid enclosure.

2. The invention of claim 1, in which said piston members are generally cup shaped and the open portions thereof face each other.

3. The invention of claim 2, in which said fluid chamber housing is substantially annular and positioned intermediate the open ends of said generally cup shaped piston members, and said members are spaced apart along said axis.

4. The invention of claim 2, in which the end of said second piston member is positioned within the end of said first piston member, and said fluid chamber is positioned around the ends of said piston members.

5. The invention of claim 1, and positioning means mounted adjacent to said fluid cushion and selectively engageable therewith, said positioning means comprising an arm movable to a position engaging said cushion, means tending to retract said arm away from cushion engaging position but permitting said arm to remain in such engaging position until said cushion is moved out of engagement with said arm.

6. The invention of claim 1, a seat mounted on said first piston member, and said fluid chamber housing mounted on a vehicle.

7. The invention of claim 1, in which said fluid cushion contains air under higher than normal atmospheric pressure.

8. The invention of claim 1, and means for maintaining the height of said fluid cushion the same for varying static weights, said means comprising a fluid line communicating with the enclosure, valve means connected to the fluid line, said valve means having means to selectively connect said fluid line to a source of fluid under pressure greater than that within the enclosure, to fluid sealing means, and to an outlet, means for controlling the operation of the valve means in response to the position of the piston members, said controlling means comprising first and second valve operating means, a bellows mounted adjacent to the members, a switch arm on said bellows, first and second switches mounted for operation by said switch arm, means connecting said first and second switches to the first and second valve operating means, means tending to position said means of said valve means in sealing position when said first and second switches are not operated, an arm connected with said bellows and movable in response to movement of said members whereby said arm tends to move said bellows from a position where it engages said one switch to a position where it engages said second switch, said bellows having damping means whereby momentary movement of the members does not move said bellows arm.

References Cited

UNITED STATES PATENTS

| | | | |
|---|---|---|---|
| 1,334,428 | 3/1920 | Amory | 267—65 |
| 3,168,278 | 2/1965 | Ogden | 248—400 X |
| 3,235,221 | 2/1966 | Conner | 248—400 |

ROY D. FRAZIER, *Primary Examiner.*

R. P. SEITTER, *Assistant Examiner.*